United States Patent
Bergman et al.

(10) Patent No.: US 10,432,482 B2
(45) Date of Patent: Oct. 1, 2019

(54) NETWORK PARAMETER CONFIGURATION BASED ON END USER DEVICE CHARACTERISTICS

(71) Applicant: Fastly, Inc., San Francisco, CA (US)

(72) Inventors: Artur Bergman, San Francisco, CA (US); Simon Wistow, Oakland, CA (US); Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 88 days.

(21) Appl. No.: 14/331,333

(22) Filed: Jul. 15, 2014

(65) Prior Publication Data

US 2015/0026315 A1 Jan. 22, 2015

Related U.S. Application Data

(60) Provisional application No. 61/846,821, filed on Jul. 16, 2013.

(51) Int. Cl.
*H04L 12/24* (2006.01)
*H04L 29/06* (2006.01)

(52) U.S. Cl.
CPC ...... *H04L 41/5041* (2013.01); *H04L 41/0803* (2013.01); *H04L 41/509* (2013.01); *H04L 65/4084* (2013.01); *H04L 69/16* (2013.01)

(58) Field of Classification Search
CPC .................................................. H04L 41/0803
See application file for complete search history.

(56) References Cited

U.S. PATENT DOCUMENTS

| | | | |
|---|---|---|---|
| 2001/0029520 A1* | 10/2001 | Miyazaki | H04L 47/10 709/200 |
| 2003/0067872 A1* | 4/2003 | Harrell | H04L 29/06027 370/229 |
| 2006/0026302 A1* | 2/2006 | Bennett | H04L 29/06027 709/246 |
| 2008/0107079 A1* | 5/2008 | Bae | H04W 76/02 370/331 |
| 2008/0114889 A1* | 5/2008 | Deshpande | H04N 21/2343 709/231 |
| 2009/0168720 A1 | 7/2009 | Vinayakray-Jani et al. | |
| 2009/0168752 A1 | 7/2009 | Segel | |
| 2010/0250701 A1* | 9/2010 | Harvell | H04L 47/193 709/217 |
| 2011/0044227 A1 | 2/2011 | Harrang et al. | |
| 2011/0137973 A1 | 6/2011 | Wei et al. | |
| 2012/0137019 A1 | 5/2012 | Kotecha et al. | |
| 2012/0246279 A1* | 9/2012 | Zang | H04L 65/4076 709/219 |
| 2013/0018978 A1* | 1/2013 | Crowe | H04L 67/2842 709/214 |

(Continued)

*Primary Examiner* — Nicholas R Taylor
*Assistant Examiner* — Sanjoy K Roy

(57) ABSTRACT

Systems, methods, and software for operating a content node are provided herein. In one example, a method of operating a content node is presented. The method includes receiving a characteristic of an end user device, and configuring one or more transmission control protocol (TCP) parameter for communications with the end user device based on at least the characteristic of the end user device. The method also includes transferring the communications using the one or more TCP parameters for delivery to the end user device.

20 Claims, 6 Drawing Sheets

(56) References Cited

U.S. PATENT DOCUMENTS

| | | | |
|---|---|---|---|
| 2013/0046857 A1* | 2/2013 | Howe | H04L 65/4069 |
| | | | 709/219 |
| 2013/0060893 A1 | 3/2013 | Harvell et al. | |
| 2014/0161050 A1* | 6/2014 | Grinshpun | H04L 65/4069 |
| | | | 370/329 |
| 2014/0289383 A1* | 9/2014 | Draznin | H04L 67/141 |
| | | | 709/222 |

* cited by examiner

| Offsets | Octet | | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | Destination port | | | | | | | | | | | | | | | |
| 4 | 32 | Sequence number | | | | | | | | | | | | | | | | | | | | | | | | | | | | | | |
| 8 | 64 | Acknowledgment number (if ACK is set) | | | | | | | | | | | | | | | | | | | | | | | | | | | | | | |
| 12 | 96 | Data Offset | | | | Re-served 0 0 0 | | | | N S | C W R | E C E | U R G | A C K | P S H | R S T | S Y N | F I N | Window Size | | | | | | | | | | | | | | |
| 16 | 128 | Checksum | | | | | | | | | | | | | | | Urgent pointer (if URG is set) | | | | | | | | | | | | | | | |
| 20 | 160 | Options (if data_offset > 5.  Padded at the end with "0" bytes if necessary.) | | | | | | | | | | | | | | | | | | | | | | | | | | | | | | |
| ... | ... | ... | | | | | | | | | | | | | | | | | | | | | | | | | | | | | | | |

TCP HEADER
600

FIGURE 6

NETWORK PARAMETER CONFIGURATION BASED ON END USER DEVICE CHARACTERISTICS

RELATED APPLICATIONS

This application hereby claims the benefit of, and priority to, U.S. Provisional Patent Application 61/846,821, titled "TCP PARAMETER CONFIGURATION BASED ON END USER DEVICE CHARACTERISTICS," filed Jul. 16, 2013, and which is hereby incorporated by reference in its entirety for all purposes.

TECHNICAL FIELD

Aspects of the disclosure are related to the field of data transfer, and in particular, data transfer between content nodes of a content delivery network and end user devices.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between the origin servers of the content providers and the end users. The content delivery networks typically have one or more content nodes distributed across a large geographic region to provide faster and lower latency access to the content for the end users. When end users request content, such as a web page, which is handled through a content node, the content node is configured to respond to the end user requests instead of the origin servers. In this manner, a content node can act as a proxy for the origin servers.

Content of the origin servers can be cached into the content nodes, and can be requested via the content nodes from the origin servers of the content originators when the content has not yet been cached. Content nodes usually cache only a portion of the original source content rather than caching all content or data associated with an original content source. The content nodes can thus maintain only recently accessed and most popular content as cached from the original content sources. Thus, content nodes exchange data with the original content sources when new or un-cached information is requested by the end users or if something has changed in the original content source data.

However, various slowdowns and latency problems in content nodes can exist due to components and software included in the content nodes, such as data storage using spinning hard disk drives, poor management of caching processes, and slow handling of changes to the original content and content configurations. Other slowdowns and latency problems exist due to the capabilities of the end user devices that are accessing content from the content nodes.

OVERVIEW

Systems, methods, and software for operating a content node are provided herein. In one example, a method of operating a content node is presented. The method includes receiving a characteristic of an end user device, and configuring one or more transmission control protocol (TCP) parameter for communications with the end user device based on at least the characteristic of the end user device. The method also includes transferring the communications using the one or more TCP parameters for delivery to the end user device.

In another example, a content delivery network for delivering content to an end user device is provided. The content delivery network includes a local data storage system configured to store content, and a content node coupled to the data storage system. The content node is configured to receive a characteristic of the end user device, configure one or more transmission control protocol (TCP) parameter for communications with the end user device based on at least the characteristic of the end user device, and transfer the communications using the one or more TCP parameters for delivery to the end user device.

In a further example, one or more computer readable storage media having program instructions stored thereon for delivering content to an end user. The program instructions, when executed by a content node direct the content node to at least receive a characteristic of the end user device, configure one or more transmission control protocol (TCP) parameter for communications with the end user device based on at least the characteristic of the end user device, and transfer the communications using the one or more TCP parameters for delivery to the end user device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

FIG. 6 is a block diagram illustrating a transmission control protocol header.

DETAILED DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," among others. In some examples, origin servers can serve the content to end user devices. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures.

Some embodiments of content delivery systems use the Transmission Control Protocol (TCP) of the Internet Protocol suite (IP) to transfer data to end user devices. TCP/IP allows for configuration of the TCP segments transferred between devices to optimize the speed and efficiency of the transfer. End user devices, in particular mobile devices, have a wide variety of characteristics affecting the speed at which data may be transferred to them. By configuring TCP headers appropriately, optimum transfer speeds may be obtained between the content delivery network and a mobile end user device. Although TCP parameters are discussed herein, it should be understood that these parameters can include other network parameters and content transmission parameters.

Figure 1:
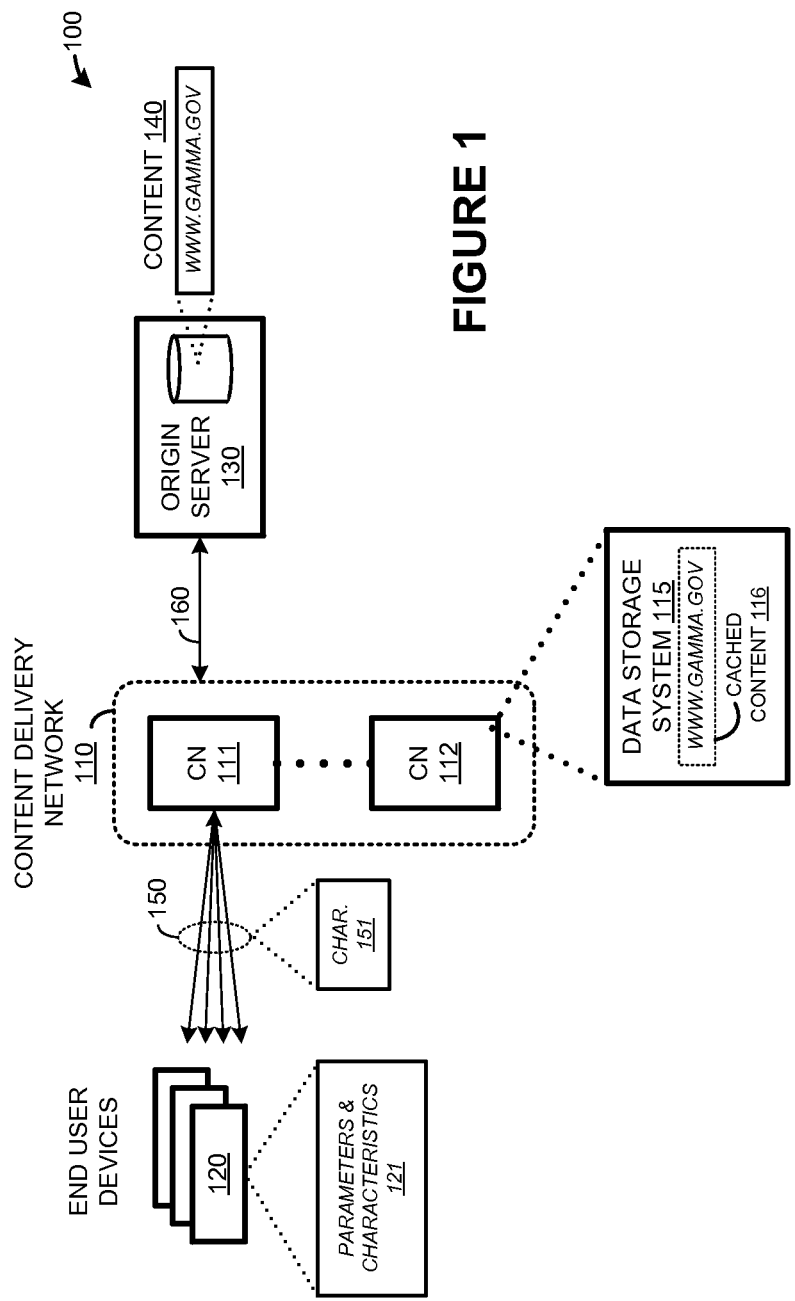
FIG. 1 is a system diagram illustrating a communication system.

As a first example employing a content delivery network, FIG. 1 is presented. FIG. 1 is a system diagram illustrating communication system 100. Communication system 100 includes content delivery network 110, end user devices 120, and origin server 130. Content delivery network 110 includes one or more content nodes (CN) 111-112. Each of CN 111-112 can include one or more data storage systems. End user devices 120 are representative of a plurality of end user devices which can request and receive network content, and any number of end user devices 120 can be associated with each of content nodes 111-112. CN 111-112 and ones of end users 120 communicate over associated network links 150, these network links 150 having a plurality of characteristics 151. Content delivery network 110 and origin server 130 communicate over associated network links 160. Although not shown in FIG. 1 for clarity, each of CN 111-112 can also communicate with each other over network links.

To further illustrate FIG. 1, a brief description of the operation of communication system 100 is included. In operation, end user devices 120 request network content, such as content 140 associated with origin server 130. Instead of these requests being handled by origin server 130, individual content nodes 111-112 of content delivery network 110 receive the content requests over ones of links 150 and processes the content requests for delivery of the content to the associated end user devices 120. Requested network content that is already stored in ones of CN 111-112 can be provided quickly to the end user devices, while network content that is not already stored in ones of CN 111-112 can be responsively requested by an associated one of CN 111-112 from an appropriate origin server 130 for delivery by the CN and possible caching by the CN. In this manner, each of CN 111-112 can act as intermediary proxy nodes to provide local and fast access for end user devices 120 to network content of origin server 130 without burdening origin server 130. FIG. 1 shows cached content 116 included in data storage system 115 of CN 112 as comprised of content 140, and thus content 140 is currently shown as cached by CN 112. Other configurations are possible, including subsets of content 140 being cached in individual ones of CN 111-112.

Although FIG. 1 shows content 140 of origin server 130 being cached by data storage system 115, other content can be handled by CN 111-112. For example, dynamic content generated by activities of end user devices 120 need not originally reside on origin server 130, and can be generated due to scripting or code included in web page content delivered by CN 111-112. This dynamic content can also be cached by ones of CN 111-112, and can be specific to a particular end user device during a communication session.

Figure 2:
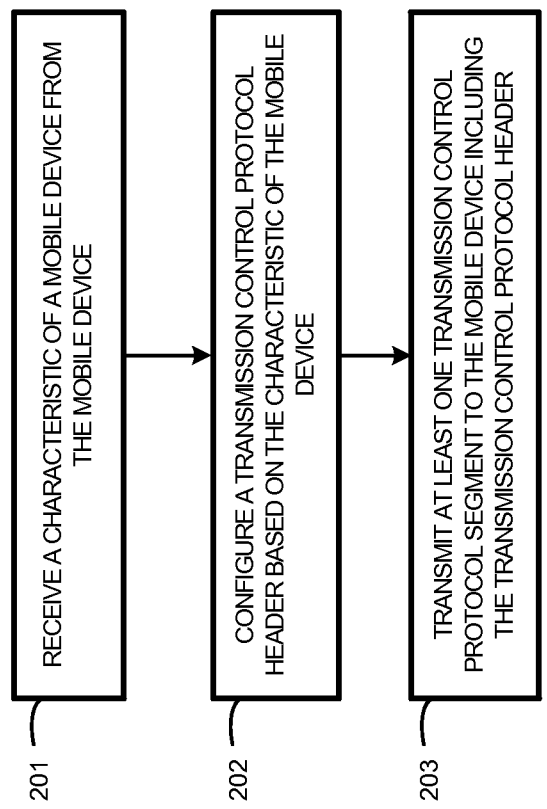
FIG. 2 is a diagram illustrating a method of operation of a content node.

FIG. 2 illustrates a flow diagram which describes an example method of operation of a content node, such as for any of content nodes 111-112 of FIG. 1. The operations of FIG. 2 are referenced parenthetically in the description below.

In FIG. 2, content node 111 receives (201) one or more characteristics 121 of an end user device, such as from end user device 120 of FIG. 1. This end user device may be a mobile device, such as a cell phone, tablet, laptop computer, or the like. The characteristics may include a wireless mode of operation, radio frequency signal strength of a present wireless access node or carrier, signal-to-noise ratio as measured by the end user device, bandwidth capability, display size, display resolution, memory capacity, available memory, make and model, operating system and revision, wireless protocol, wireless protocol version, or wireless protocol generation, and the like.

Content node 111 configures (202) one or more transmission control protocol (TCP) parameters based on the one or more characteristics 121 of the end user device 120. Example TCP parameters can include congestion settings and transmission window sizes. Other TCP parameters can include the various fields included in a TCP header. An example TCP header is illustrated in detail in FIG. 6. Content node 111 can configure TCP header fields such as Source Port, Destination Port, Sequence Number, Acknowledgment Number, Window Size, Checksum, Urgent Pointer, and any of the Options based on the characteristic of the end user device. These fields within the TCP header are configured to optimize data transfer between content node 111 and the end user device based on the one or more characteristics of the end user device.

Content node 111 transfers (203) the communications using the TCP parameters for delivery to the end user device, such as end user device 120. The communications can include user content requested by the end user device. The communications can include at least one TCP segment transferred to end user device 120 including the customized TCP header fields. Each TCP segment can include a TCP header and a data section containing content carried from content node 111 to end user device 120.

In further examples, end user device 120 can execute a user application which provides content to end user device 120. The user application can be a browser or Internet web browser which can access any website via a uniform resource locator (URL). In other examples, the user application is a custom application for the specific content desired by the user, such as a news application or video streaming application. The custom user application can be configured to identify one or more characteristics of the end user device and transfer the one or more characteristics of the end user device for delivery to any of CN 111-112.

For example, end user device 120 can be presently communicating over a fourth generation (4G) wireless communication protocol, such as Long Term Evolution (LTE). The custom application executed on end user device 120 can identify the 4G mode and transfer an indication of this 4G mode for delivery to any of CN 111-112. Other characteristics can also be transferred by end user device 120. Responsively, any of CN 111-112 can process these characteristics, such as the 4G mode indicator, and modify TCP transfer settings based on these characteristics. For example, a TCP window size can be altered based on these characteristics. Other TCP parameters can be altered, as described herein. Typically, if a user of end user device 120 uses a web browser application, these characteristics are not provided to any of CN 111-112. Instead, a custom user application can be employed which is configured to identify and transfer these characteristics.

Figure 3:
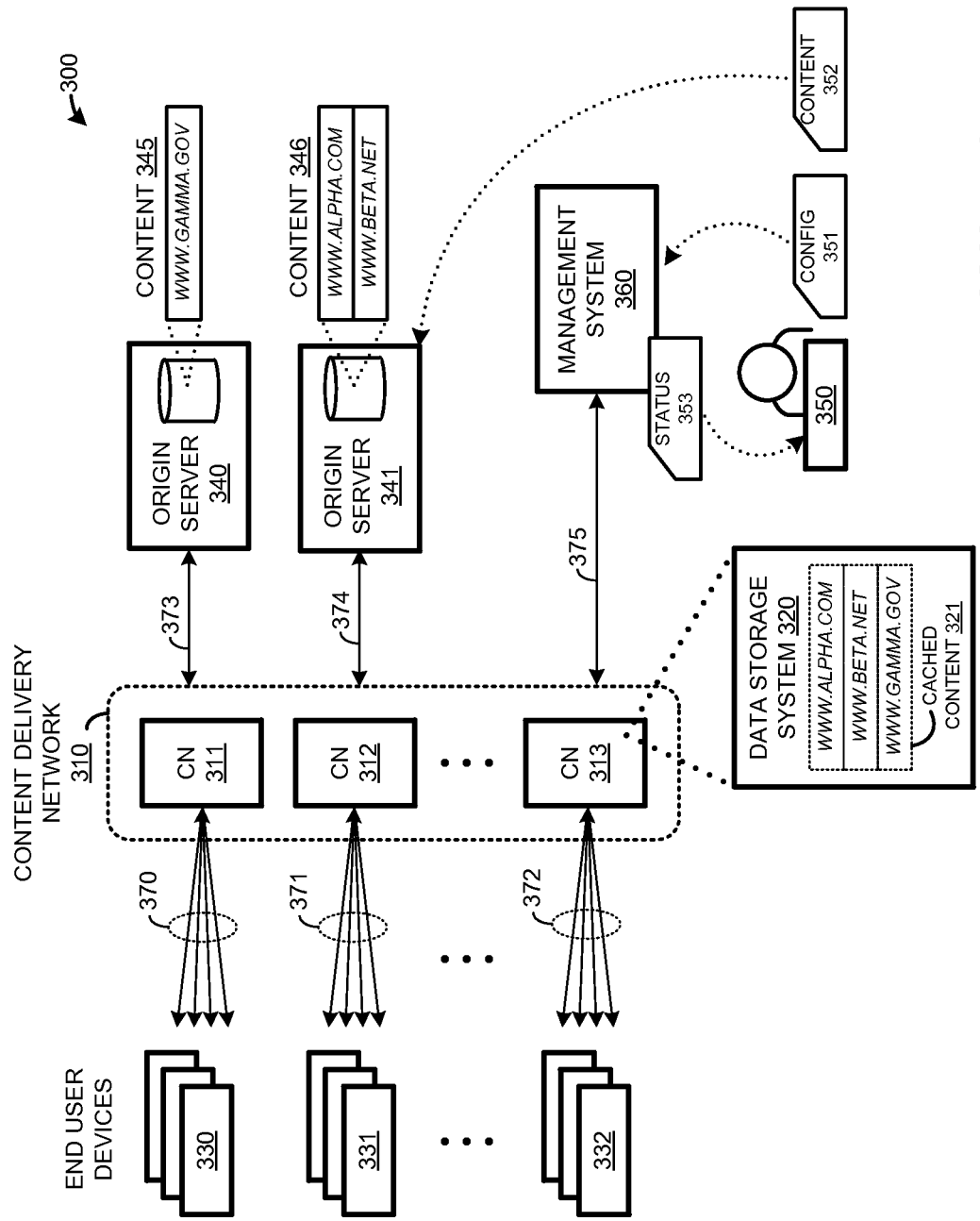
FIG. 3 is a system diagram illustrating a communication system.

As a second example employing a content delivery system, FIG. 3 is presented. FIG. 3 is a system diagram illustrating communication system 300. Communication system 300 includes content delivery network 310, end user devices 330-332, origin servers 340-341, and management system 360. Content delivery network 310 includes one or more content nodes (CN) 311-313. Each of CN 311-313 can include one or more data storage systems, such as that illustrated for CN 313 as data storage system 320. End user devices 330-332 are representative of a plurality of end user devices which can request and receive network content, and any number of end user devices 330-332 can be associated with each of content nodes 311-313. CN 311-313 and ones of end users 330-332 communicate over associated network links 370-372. Content delivery network 310 and origin servers 340-341 communicate over associated network links 373-374. Content delivery network 310 and management system 360 communicate over link 375. Although not shown in FIG. 3 for clarity, each of CN 311-313 can also communicate with each other over network links.

To further illustrate FIG. 3, a brief description of the operation of communication system 300 is included. In operation, end user devices 330-332 request network content, such as content 345-346 associated with origin servers 340-341. Instead of these requests being handled by the individual origin servers 340-341, individual content nodes 311-313 of content delivery network 310 receive the content requests over ones of links 370-372 and processes the content requests for delivery of the content to the associated end user devices 330-332. Requested network content that is already stored in ones of CN 311-313 can be provided quickly to the end user devices, while network content that is not already stored in ones of CN 311-313 can be responsively requested by an associated one of CN 311-313 from an appropriate origin server 340-341 for delivery by the CN and possible caching by the CN. In this manner, each of CN 311-313 can act as intermediary proxy nodes to provide local and fast access for end user devices 330-332 to network content of origin servers 340-341 without burdening origin servers 340-341. FIG. 3 shows cached content 321 included in data storage system 320 of CN 313 as comprised of content 345-346, and thus content 345-346 is currently shown as cached by CN 313. Other configurations are possible, including subsets of content 345-346 being cached in individual ones of CN 311-313.

Although FIG. 3 shows content 345-346 of origin servers 340-341 being cached by data storage system 320, other content can be handled by CN 311-313. For example, dynamic content generated by activities of end user devices 330-332 need not originally reside on origin servers 340-341, and can be generated due to scripting or code included in web page content delivered by CN 311-313. This dynamic content can also be cached by ones of CN 311-313, and can be specific to a particular end user device during a communication session.

Management system 360 handles configuration changes and status information collection and delivery for system operators and for the origin server operators or managers. For example, operator device 350 can transfer configuration 351 for delivery to management system 360, where configuration 351 can alter the handling of network content requests by CN 311-313, among other operations. Also, management system 360 can monitor status information for the operation of CN 311-313, such as operational statistics, and provide this status information as 353 to operator device 350. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

Figure 4:
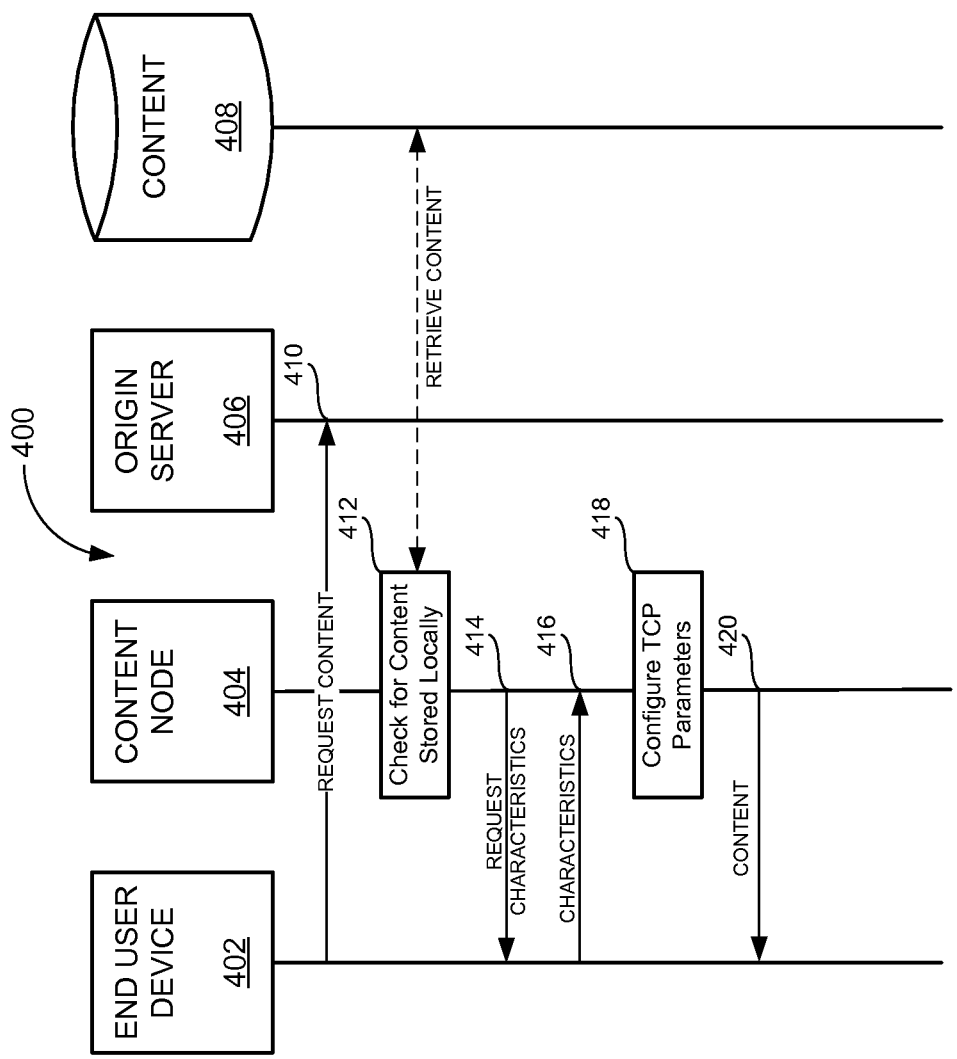
FIG. 4 is a method flow diagram illustrating a method of operation of a communication system.

FIG. 4 is a method flow diagram illustrating a method of operation 400 of a communication system. In this example, end user device 402 requests content from origin server 406 (operation 410). Content node 404 receives this content request and checks to see if it has the content cached locally (operation 412). If content node 404 has the content stored locally, it sends a request for characteristics to end user device 402 (operation 414).

End user device 402 responds to the request by sending one or more characteristics of end user device 402 to content node 404 (operation 416). Content node 404 processes the one or more characteristics of end user device 402 and configures TCP parameters based on the one or more characteristics (operation 418). Content node 404 then sends the content to end user device 402 using the TCP parameters (operation 420).

In the case where content node 404 does not have the content stored locally, content node 404 requests the content from origin server 406. Origin server 406 responsively delivers content 408 to end user device 402, and content node 404 may store some or all of the delivered content 408 locally for future requests.

Figure 5:
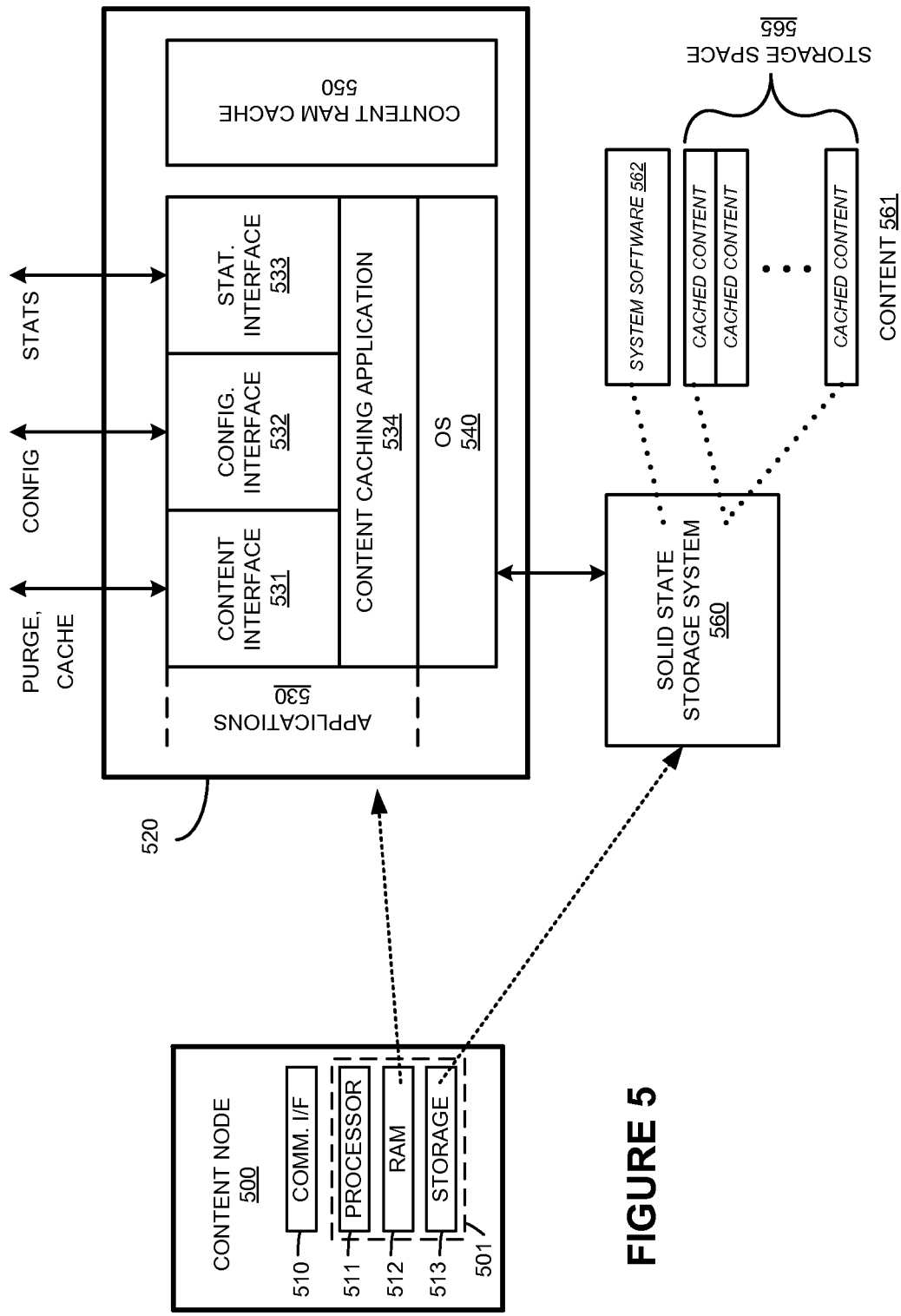
FIG. 5 is a block diagram illustrating a content node.

To further describe the operation of any of CN 311-313 of FIG. 3, FIG. 5 is provided which illustrates content node (CN) 500. It should be understood that CN 311-313 can each use other configurations, and CN 500 is merely one example. CN 500 includes communication interface 510, processor 511, random access memory (RAM) 512, and storage 513. Example contents of RAM 512 are further detailed in RAM space 520, and example contents of storage 513 are further detailed in solid state storage system 560.

Processing system 501 can include one or more of processor 511, RAM 512, and storage 513. In operation, processor 511 is operatively linked to communication interface 510, RAM 512, and storage 513. Processor 511 is capable of executing software stored in RAM 512 or storage 513. When executing the software, processor 511 drives CN 500 to operate as described herein. CN 500 can also include other elements, such as user interfaces, computer systems, databases, distributed storage and processing elements, and the like.

Processor 511 can be implemented within a single processing device but can also be distributed across multiple processing devices or sub-systems that cooperate in executing program instructions. Examples of processor 511 include general purpose central processing units, microprocessors, application specific processors, and logic devices, as well as any other type of processing device.

Communication interface 510 includes one or more network interfaces for communicating over communication networks, such as packet networks, the Internet, and the like. The network interfaces can include one or more local or wide area network communication interfaces which can communicate over Ethernet or Internet protocol (IP) links. Examples of communication interface 510 include network interface card equipment, transceivers, modems, and other communication circuitry.

RAM 512 and storage 513 together can comprise a data storage system, such as that illustrated in data storage system 320 in FIG. 3, although variations are possible. RAM 512 and storage 513 can each comprise any non-transitory storage media readable by processor 511 and capable of storing software. RAM 512 can include volatile and non-volatile, removable and non-removable media implemented in any method or technology for storage of information, such as computer readable instructions, data structures, program modules, or other data. Storage 513 can include non-volatile storage media, such as solid state storage media, flash memory, or as illustrated by solid state storage system 560 in this example. RAM 512 and storage 513 can each be implemented as a single storage device but can also be implemented across multiple storage devices or sub-systems. RAM 512 and storage 513 can each comprise additional elements, such as controllers, capable of communicating with processor 511.

Software stored on or in RAM 512 or storage 513 can comprise computer program instructions, firmware, or some other form of machine-readable processing instructions having processes that when executed by processor 511 direct CN 500 to operate as described herein. For example, software drives CN 500 to receive requests for content, determine if the content is stored in CN 500, retrieve content from origin servers, transfer content to end user devices, manage data storage systems for handling and storing the content, and configure a transmission control protocol (TCP) header based on the characteristic of the mobile device, among other operations. The software can also include user software applications. The software can be implemented as a single application or as multiple applications. In general, the software can, when loaded into processor 511 and executed, transform processor 511 from a general-purpose device into a special-purpose device customized as described herein.

RAM space 520 illustrates a detailed view of an example configuration of RAM 512. It should be understood that different configurations are possible. RAM space 520 includes applications 530, operating system (OS) 540, and content RAM cache 550. Content RAM cache 550 includes RAM space for temporary storage of content received over content interface 531, such as dynamic random access memory (DRAM).

Applications 530 include content interface 531, configuration interface 532, statistics interface 533, and content caching application 534. Content caching application 534 handles caching of content and management of storage spaces, such as content RAM cache 550 and storage space 565, as well as exchanges content, data, and instructions via content interface 531, configuration interface 532, and statistics interface 533. Content caching application 534 can comprise a custom application, Varnish caching software, hypertext transfer protocol (HTTP) accelerator software, or other content caching and storage applications, including variation, modifications, and improvements thereof. Applications 530 and OS 540 can reside in RAM space 520 during execution and operation of CN 500, and can reside in system software storage space 562 on solid state storage system 560 during a powered-off state, among other locations and states. Applications 530 and OS 540 can be loaded into RAM space 520 during a startup or boot procedure as described for computer operating systems and applications.

Content interface 531, configuration interface 532, and statistics interface 533 each allow a user to interact with and exchange data with content caching application 534. In some examples, each of content interface 531, configuration interface 532, and statistics interface 533 comprise an application programming interface (API). Content interface 531 allows for exchanging content for caching in CN 500 by content caching application 534, and can also receive instructions to purge or erase data from CN 500. Configuration interface 532 allows for altering the configuration of various operational features of content caching application 534. In some examples, configuration interface 532 comprises a scripting language interface, such as Varnish Configuration Language (VCL), Perl, PHP, Javascript, or other scripting or interpreted language-based interfaces. Statistics interface 533 allows for exchange of statistical information related to the operation of CN 500, such as cache hits/misses, cache fullness information, cache performance statistics, timing statistics, history metrics, among other statistical information. Content interface 531, configuration interface 532, and statistics interface 533 each can communicate with external systems via communication interface 510 over any associated network links.

Solid state storage system 560 illustrates a detailed view of an example configuration of storage 513. Solid state storage system 560 can comprise flash memory such as NAND flash or NOR flash memory, among other solid state storage technologies. As shown in FIG. 5, solid state storage system 560 includes system software 562, as well as content 561 stored in storage space 565. As described above, system software 562 can be a non-volatile storage space for applications 530 and OS 540 during a powered-down state of CN 500, among other operating software. Content 561 includes cached content, such as the web content examples in FIG. 3, which can include text, data, pictures, video, audio, web pages, scripting, code, dynamic content, or other network content.

It should be understood that content node 500 is generally intended to represent a computing system with which at least software 530 and 540 are deployed and executed in order to render or otherwise implement the operations described herein. However, content node 500 can also represent any computing system on which at least software 530 and 540 can be staged and from where software 530 and 540 can be distributed, transported, downloaded, or otherwise provided to yet another computing system for deployment and execution, or yet additional distribution.

FIG. 6 is a block diagram illustrating transmission control protocol header 600. Each TCP segment includes a TCP header as illustrated in FIG. 6 along with a data section following the header.

TCP headers include the following fields:
Source port (16 bits)—identifies the sending port.
Destination port (16 bits)—identifies the receiving port
Sequence number (32 bits)—has a dual role:
If the SYN flag is set (1), then this is the initial sequence number. The sequence number of the actual first data byte and the acknowledged number in the corresponding ACK are this sequence number plus 1.

If the SYN flag is clear (0), then this is the accumulated sequence number of the first data byte of this segment for the current session.

Acknowledgment number (32 bits)—if the ACK flag is set then the value of this field is the next sequence number that the receiver is expecting. This acknowledges receipt of all prior bytes (if any). The first ACK sent by each end acknowledges the other end's initial sequence number itself, but no data.

Data offset (4 bits)—specifies the size of the TCP header in 32-bit words. The minimum header size is 5 words (20 bytes) and the maximum is 15 words (60 bytes), allowing for up to 40 bytes of options in the header. The Data offset is also the offset from the start of the TCP segment to the actual data.

Reserved (3 bits)—reserved for future use and should be set to 0.

Flags (9 bits) (aka Control bits)—contains 9 1-bit flags:
NS (1 bit)—ECN-nonce concealment protection (added to header by RFC 3540).
CWR (1 bit)—Congestion Window Reduced (CWR) flag is set by the sending host to indicate that it received a TCP segment with the ECE flag set and had responded in the congestion control mechanism (added to header by RFC 3168).
ECE (1 bit)—ECN-Echo indicates:
If the SYN flag is set (1), that the TCP peer is ECN capable.
If the SYN flag is clear (0), that a packet with Congestion Experienced flag in the IP header set is received during normal transmission (added to header by RFC 3168).
URG (1 bit)—indicates that the Urgent pointer field is significant.
ACK (1 bit)—indicates that the Acknowledgment field is significant. All segments after the initial SYN segment sent by the client should have this flag set.
PSH (1 bit)—Push function. Asks to push the buffered data to the receiving application.
RST (1 bit)—Reset the connection.
SYN (1 bit)—Synchronize sequence numbers. Only the first segment sent from each end should have this flag set. Some other flags change meaning based on this flag, and some are only valid when it is set, and others when it is clear.
FIN (1 bit)—No more data from sender.

Window size (16 bits)—the size of the receive window, which specifies the number of window size units (by default, bytes) (beyond the sequence number in the acknowledgment field) that the sender of this segment is currently willing to receive.

Checksum (16 bits)—The 16-bit checksum field is used for error-checking of the header and data.

Urgent pointer (16 bits)—if the URG flag is set, then this 16-bit field is an offset from the sequence number indicating the last urgent data byte.

Options (Variable 0-320 bits, divisible by 32)—The length of this field is determined by the data offset field. Options have up to three fields: Option-Kind (1 byte), Option-Length (1 byte), Option-Data (variable). The Option-Kind field indicates the type of option, and is the only field that is not optional. Depending on what kind of option is being dealt with, the next two fields may be set: the Option-Length field indicates the total length of the option, and the Option-Data field contains the value of the option, if applicable. For example, an Option-Kind byte of 0x01 indicates that this is a No-Op option used only for padding, and does not have an Option-Length or Option-Data byte following it. An Option-Kind byte of 0 is the End Of Options option, and is also only one byte. An Option-Kind byte of 0x02 indicates that this is the Maximum Segment Size option, and will be followed by a byte specifying the length of the MSS field (should be 0x04). Note that this length is the total length of the given options field, including Option-Kind and Option-Length bytes. So while the MSS value is typically expressed in two bytes, the length of the field will be 4 bytes (+2 bytes of kind and length). In short, an MSS option field with a value of 0x05B4 will show up as (0x02 0x04 0x05B4) in the TCP options section.

Padding—The TCP header padding is used to ensure that the TCP header ends and data begins on a 32 bit boundary. The padding is composed of zeros.

Content node 311 may configure one or more of these fields within TCP header 600 based on one or more characteristics of mobile end user device 330. These fields within the TCP header are configured to optimize data transfer between content node 311 and mobile end user device 330.

Referring back to FIG. 3, CN 311-313, origin servers 340-341, and management system 360 can each include communication interfaces, network interfaces, processing systems, computer systems, microprocessors, storage systems, storage media, or some other processing devices or software systems, and can be distributed among multiple devices. Examples of CN 311-313, origin servers 340-143, and management system 360 can each include software such as an operating system, logs, databases, utilities, drivers, caching software, networking software, and other software stored on a computer-readable medium. Content delivery network 310, in addition to including CN 311-313, can include equipment and links to route communications between CN 311-313 and any of end user devices 330-332, origin servers 340-341, and management system 360, among other operations.

End user devices 330-332 can each be a user device, subscriber equipment, customer equipment, access terminal, smartphone, personal digital assistant (PDA), computer, tablet computing device, e-book, Internet appliance, media player, game console, or some other user communication apparatus, including combinations thereof Communication links 370-375 each use metal, glass, optical, air, space, or some other material as the transport media. Communication links 370-375 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof Communication links 370-375 can each be a direct link or can include intermediate networks, systems, or devices, and can include a logical network link transported over multiple physical links. Although one main link for each of links 370-375 is shown in FIG. 3, it should be understood that links 370-375 are merely illustrative to show communication modes or access pathways. In other examples, further links can be shown, with portions of the further links shared and used for different communication sessions or different content types, among other configurations. Communication links 370-375 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a content node, the content node configured to cache content; receive requests for content, transfer content if the requested content is cached, and if content is not cached, retrieve the requested content from an origin server, cache requested content, and transmit requested content, the method comprising:
    receiving, at the content node, a request for the content from the end user device;
    determining whether the content is available from a local data storage system;
    after receiving the request for content, requesting from a custom application on the end user device at least one characteristic of the end user device, wherein the custom application is configured to identify the at least one characteristic of the end user device and transfer the at least one characteristic to the content node, wherein the at least one characteristic comprises memory capacity of the end user device and available memory of the end user device;
    receiving, at the content node, the at least one characteristic of the end user device from the custom application on the end user device;
    configuring, at the content node, one or more transmission control protocol (TCP) parameters for communications with the end user device based on at least the characteristic of the end user device, wherein the TCP parameters comprise a Window Size parameter; and
    transferring, from the content node, the communications using the one or more TCP parameters for delivery to the end user device.

2. The method of claim 1, further comprising:
    retrieving the content from the local data storage system when the content is available from the local data storage system;
    retrieving the content from an origin server when the content is not available from the local data storage system; and
    incorporating the content into the communications with the end user device, wherein requesting from the application on the end user device at least the characteristic of the end user device occurs in response to determining that the content is available from a local data storage system.

3. The method of claim 1, wherein the at least one characteristic of the end user device comprises a preferred communication protocol mode of the end user device.

4. The method of claim 1, wherein the at least one characteristic of the end user device comprises a bandwidth capability of the end user device.

5. The method of claim 4, wherein configuring one or more TCP parameters comprises configuring the TCP Window Size parameter based on the bandwidth capability of the end user device.

6. The method of claim 1, wherein configuring one or more TCP parameters comprises configuring a TCP Options parameter.

7. The method of claim 1, wherein the at least one characteristic of the end user device comprises a signal-to-noise ratio as measured by the end user device.

8. The method of claim 7, wherein configuring one or more TCP parameters comprises setting a TCP Congestion Window Reduced flag.

9. The method of claim 1, wherein transferring the communications using the one or more TCP parameters comprises:
    constructing at least one TCP segment, including a TCP header which includes the one or more TCP parameters, and a data segment containing content for delivery to the end user device; and
    transferring the at least one TCP segment to the end user device.

10. A content delivery network for caching and delivering content to an end user device comprising:
    a local data storage system configured to store content; and
    a content node coupled to the local data storage system, and configured to cache content in the local data storage system; receive requests for content, transfer content if the requested content is cached on the local data storage system, and if content is not cached on the local data storage system, retrieve the requested content from an origin server, cache requested content, and transmit requested content; and further configured to:
        receive a request for the content from a custom application on the end user device;
        determine whether the content is cached in the local data storage system;
        in response to receiving the request for the content, request from the custom application on the end user device at least one characteristic of the end user device, wherein the custom application is configured to identify the at least one characteristic of the end user device and transfer the at least one characteristic to the content node, wherein the at least one characteristic comprises at least one of memory capacity of the end user device and available memory of the end user device;
        receive the at least one characteristic of the end user device from the custom application on the end user device;
        configure one or more transmission control protocol (TCP) parameters for communications with the end user device based on at least the characteristic of the end user device, wherein the TCP parameters comprise a Window Size parameter; and
        transfer the communications using the one or more TCP parameters for delivery to the end user device.

11. The content delivery network of claim 10, wherein the content node is further configured to:
    retrieve the content from the local data storage system when the content is available from the local data storage system;

retrieve the content from an origin server when the content is not available from the local data storage system; and incorporate the content into the communications with the end user device, wherein the content node requests from the custom application on the end user device at least the characteristic of the end user device occurs in response to determining that the content is available from a local data storage system.

12. The content delivery network of claim 10, wherein the at least one characteristic of the end user device is a preferred communication protocol mode of the end user device.

13. The content delivery network of claim 10, wherein the at least one characteristic of the end user device comprises a bandwidth capability of the end user device.

14. The content delivery network of claim 13, wherein configuring one or more TCP parameters comprises configuring the TCP Window Size parameter based on the bandwidth capability of the end user device.

15. The content delivery network of claim 10, wherein configuring one or more TCP parameters comprises configuring a TCP Options parameter.

16. The content delivery network of claim 10, wherein the at least one characteristic of the end user device comprises a signal-to-noise ratio as measured by the end user device.

17. The content delivery network of claim 16, wherein configuring one or more TCP parameters comprises setting a TCP Congestion Window Reduced flag.

18. The content delivery network of claim 10, wherein the content node is further configured to:

construct at least one TCP segment, including a TCP header which includes the one or more TCP parameters, and a data segment containing content for delivery to the end user device; and transfer the at least one TCP segment to the end user device.

19. A computer apparatus to operate a content node in a content delivery network, the content node configured to: cache content, receive requests for content, transfer content if the requested content is cached, and if requested content is not cached, retrieve the requested content from an origin server, cache requested content and transfer requested content, the computer apparatus comprising:

processing instructions upon receipt of a request for the content from an application on an end user device that direct the content node, when executed by the content node, to:

determine whether the content is cached;

request at least one characteristic of the end user device from a custom application on the end user device, wherein the custom application is configured to identify the at least one characteristic of the end user device and transfer the at least one characteristic to the content node;

after receiving the request for content, request from the application on the end user device at least one characteristic of the end user device, wherein the at least one characteristic comprises memory capacity of the end user device and available memory of the end user device;

configure one or more transmission control protocol (TCP) parameters for communications with the end user device based on the at least one characteristic of the end user device, wherein the TCP parameters comprise a Window Size parameter;

receive at least the characteristic of the end user device from the custom application on the end user device, wherein the at least one characteristic comprises at least one of a display size, a display resolution, memory availability, and/or a make and model of the end user device incorporate the content into the communications with the end user device;

transfer the communications using the one or more TCP parameters for delivery to the end user device; and one or more non-transitory computer readable media that store the processing instructions.

20. The computer apparatus of claim 19, comprising:

the processing instructions that further direct the content node, when executed by the content node, to:

retrieve the content from cached memory when the content is available;

retrieve the content from an origin server when the content is not available from cached memory; and incorporate the content into the communications with the end user device, wherein the processing instructions direct the control node to request from the custom application on the end user device at least the characteristic of the end user device in response to determining that the content is available from cached memory.

* * * * *